June 16, 1942.   D. KLEIST ET AL   2,287,006
APPARATUS FOR MAKING GLASS WOOL
Filed April 14, 1937   3 Sheets-Sheet 1
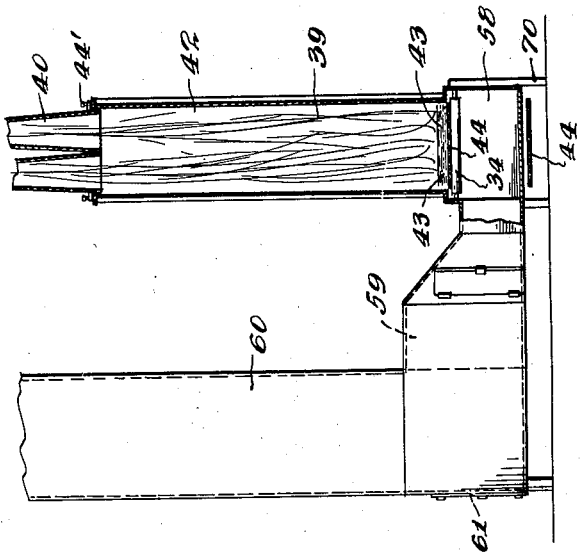
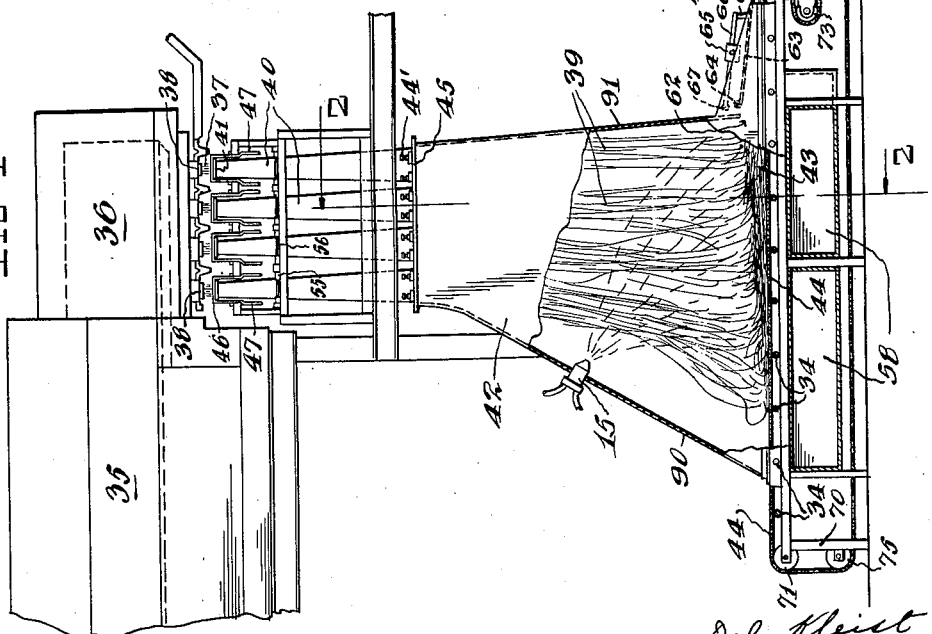
Dale Kleist
James Slayter
INVENTOR.
BY Rule & Hoge
ATTORNEYS.

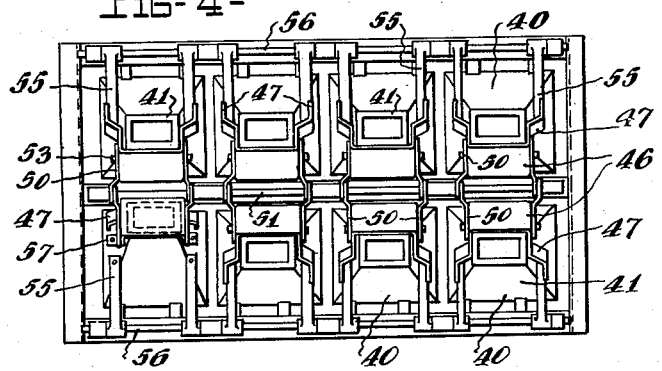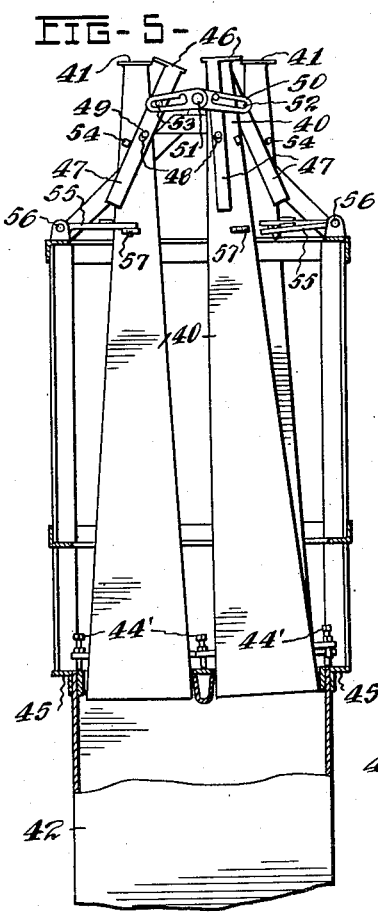

June 16, 1942.    D. KLEIST ET AL    2,287,006
APPARATUS FOR MAKING GLASS WOOL
Filed April 14, 1937    3 Sheets-Sheet 3
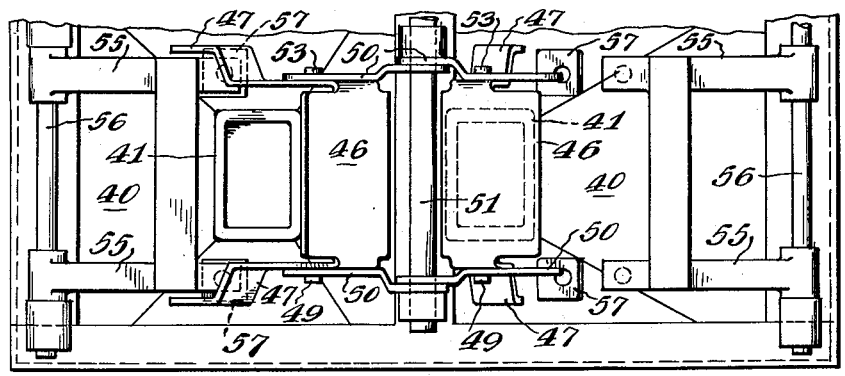
FIG-6-
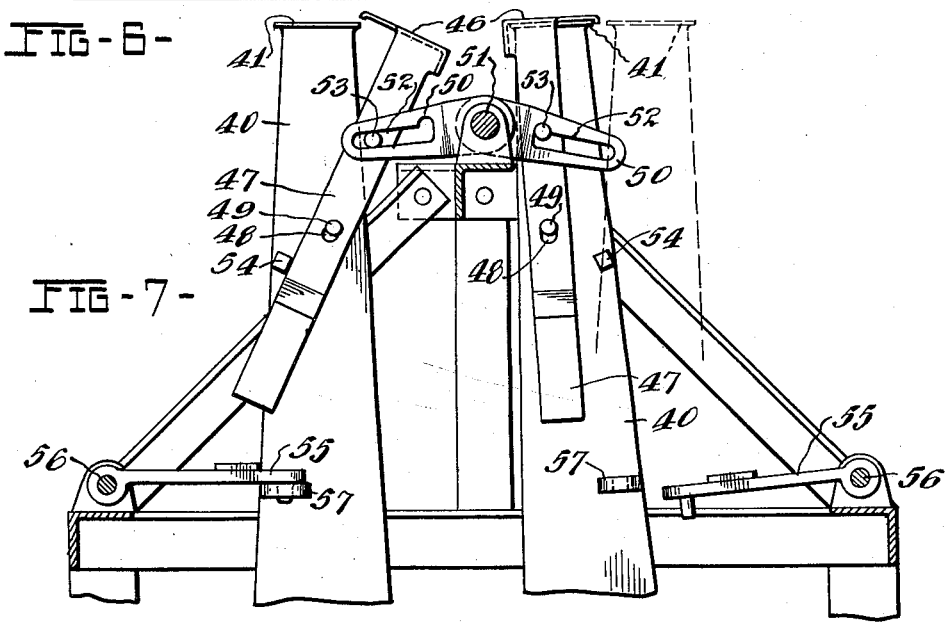
FIG-7-
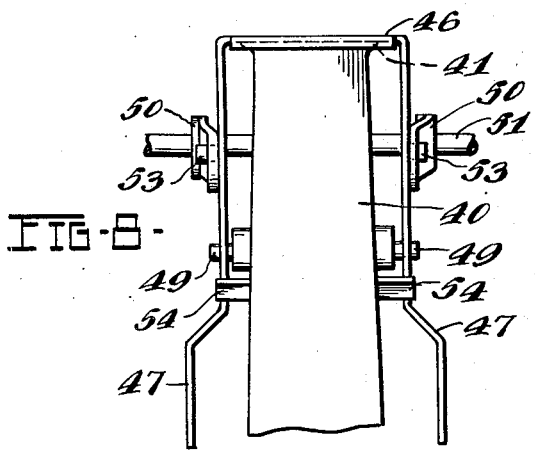
FIG-8-
Dale Kleist
James Slayter
INVENTOR.
BY Rule & Hoge
ATTORNEYS.

Patented June 16, 1942

2,287,006

UNITED STATES PATENT OFFICE 2,287,006

APPARATUS FOR MAKING GLASS WOOL

Dale Kleist and Games Slayter, Newark, Ohio, assignors, by mesne assignments, to Owens-Corning Fiberglas Corporation, a corporation of Delaware Application April 14, 1937, Serial No. 136,893

17 Claims. (Cl. 154—27)

Our invention relates to apparatus for use in the manufacture of inorganic fibrous material in matted form, by a continuous process which comprises flowing the molten material in small streams, continuously drawing and attenuating said streams in the form of fine fibers by means of blasts of steam or other gas, and causing the fibers as they are formed to solidify and accumulate in matted form on a conveyor mechanism by which the mat, as it is formed, is advanced continually in mat form.

The invention more particularly relates to a novel form of hood or spout through which the fibers, during their formation, are carried by the blast, and from where they are deposited upon a suitable support or platform such as a chain belt or the like, where they build up into an interfelted matted form.

Heretofore in the use of barrels or hoods adapted to guide the blast of gases and the fibers onto a collecting platform or surface, great difficulty was experienced in forming a uniform, light, fluffy mat which was free from clots, rolled balls, knots, uneven places, and the like. Another difficulty experienced was caused by the high back pressure built up in the interior of the hood heretofore used, this causing a large amount of gases to blow out of the top of the hood, carrying with it large amounts of glass wool which blew all over the room and adhered to the sides of the bushing or outlet orifices of the supply body, where it reheated, fused, and flowed down to the outlet openings, where it interfered with the formation of the fibers. As a matter of fact, the air was so filled with fibers that it was almost unbearable to work in the vicinity of the hood. Moreover, the glass fibers which blew out of the side of the hood or openings thereof, accumulated around the blower and actually clogged the jets thereof with glass. In addition, when using the old hoods, it is necessary to provide suction means underneath the accumulating belt in order to assist the passage of gas therethrough. It was also difficult when applying coating substances in the form of emulsions or the like, to maintain the proper temperature conditions within the hood for obtaining maximum distribution of the coating material without producing a wet, soppy mass, or without causing the coating substances to impinge upon and collect in material quantities upon the side walls of the hood from where they might drop in gobs upon the mat.

In the use of the barrels or hoods of the prior art, great difficulty was experienced in building up a uniformly felted mass of fibers, particularly if the fibers were deposited from a plurality of individual blasts of gas. There was a strong tendency to form thick and thin spots throughout the mat, and to find the mat filled with knots or lumps which seriously affected both the density of the mat and the heat efficiency thereof.

An object of the present invention is to overcome the foregoing difficulties found in the prior art.

Another object of the present invention is to provide a novel form of streamlined hood or spout to control the passage of gaseous blasts and the indraft of air induced by the blast; and to do this in a manner permitting the blast to obtain a high efficiency in attenuating the fibers, and in such a manner that the fibers are prevented from being scattered or blown outside the hood or carried back to the feeder outlet from which the material issues.

A further object of the invention is to provide a novel type of streamlined spout or hood by which the passage of the downwardly moving blasts of gas and the fibers carried therewith are controlled, and the fibers are caused to accumulate in a compact, evenly distributed mat or web on a traveling screen conveyor therebeneath.

Another object of the invention is to provide means for building a compact, uniformly interfelted and intermatted bat without the necessity for a compacting chain overlying the mat or a compressing roll, and without the necessity of the usual suction fan underneath or behind the conveyor screen. We have found that by designing the contours of the hoods or spouts properly, it is possible to cause all of the blasts to be carried away smoothly and easily without a material loss of energy, without excess turbulence tending to break up the fibers into small pieces and shorter lengths, and without the necessity of additional artificial means to carry away and discharge the spent gases.

A further object of the invention is to provide means by which the individual spouts can be withdrawn from their operative position beneath the blowers, and automatic means for closing the upper end of the spout when withdrawn, thereby preventing a backdraft by which the fibers would be blown upward through the inoperative spout. Such a backdraft and discharge of fibers creates an intolerable situation for the operators. More or less of the fibers are also carried by such drafts back to the feeder outlet where they accumulate in an objectionable manner and sometimes fuse to the feeders or bushings and interrupt operation.

Still another object of the invention is to provide a nozzle or mouth opening having the proper contours adapted to admit and even suck in all of the steam blasts and the accompanying fibers, and also to admit a predetermined amount of induced air from the surrounding atmosphere; and to do this without causing a gaseous disturbance, or vibration, or loud noise, to occur at the mouth opening.

Other objects and advantages of the present invention will become apparent from the following description taken in conjunction with the drawings, in which:

Fig. 1 is a part sectional side elevational view showing the glass melting furnace, the feeding mechanism, blowers, spouts, accumulating hoods, and a portion of the horizontal conveyor mechanism upon which the mat is formed and by which it is advanced in the form of a continuous mat;

Fig. 2 is a part sectional elevational view substantially at the line 2—2 on Fig. 1;

Figs. 3 to 8, inclusive, illustrate the spouts through which the material is blown during the fiber forming process, or shortly thereafter;

Fig. 3 is an elevation of the battery of spouts;

Fig. 4 is a plan view of the same;

Fig. 5 is an end elevation of the same;

Fig. 6 is a plan view on a larger scale showing the upper portion of a pair of spouts and associated mechanism;

Fig. 7 is a side elevation of the same; and

Fig. 8 is an end elevation of the same.

The present application is a continuation in part of the application filed by us October 1, 1935, S. N. 43,072, which has matured into Patent Number 2,192,917, dated March 12, 1940.

One of the principal features of the present invention is the provision of a Venturi spout or nozzle into which the steam blast is projected. The mouth of the spout is preferably provided with a slightly flaring opening adapted to admit the gaseous blast and induced air in a smooth, streamlined flow, and to inhibit excesssive turbulence, vibration and noises at this point. The venturi or nozzle acts as a steam pump, building up sufficient pressure in the lower part of the forming hood to felt or pack the fibers and force the steam and induced air through the open work conveyor or belt at the lower end of the hood, without causing the pressure to build up to excessive amounts which would tend to blow part of the wool and the steam out of the top of the nozzle or mouth opening.

The hood itself is of gradually expanding cross-section from the mouth of the nozzle down to the belt, and in this manner the steam therein is gradually permitted to expand and decelerate in velocity so that only a sufficient predetermined amount of energy in the steam is used to form the pack; and as a result, a well matted, uniform pack is formed throughout. If excessive energies in the steam are used to form the pack, the wool is blown excessively hard against the conveyor where it tends to break up into shorter lengths and is driven directly through the belt in excessive amounts. The expanding walls of the hood and nozzle also provide a steam pump effect or action, in which all of the fibers are caused to suck in through the mouth of the hood without permitting any of them to blow out and be lost.

Another feature of the expanding streamlined contours of the hood is the reduction or minimization of undesirable turbulence which would cause the fibers to break up into short hairy lengths or chaffs.

Referring particularly to Fig. 1, a glass melting and refining tank 35 is provided with a forehearth 36 within which a head of glass is maintained. The glass flows continuously through the feeder outlet in the floor of the boot, in a multiplicity of small streams 37 which are acted upon by blowers 38. The issuing streams of glass are enveloped in the downward blast of steam or other gas supplied by the blowers and are thereby continuously drawn out into fine filaments or fibers 39.

The feeder and blower mechanisms are not illustrated in detail, as they do not in themselves form a part of the present invention. They may be constructed and operated in the manner illustrated and described in the United States Patent to Slayter and Thomas, No. 2,133,236, October 11, 1938.

Vertically disposed spouts 40 individual to the blowers 38 are positioned with their open upper ends directly beneath and spaced a short distance from the blowers. The dimensions of the open upper ends of the individual spouts 40 are substantially the same as and slightly in excess of the horizontal dimensions of the respective blowers 38 in order that the gaseous blasts and streams of glass enveloped thereby may more readily be completely received by the spouts. The steam blast from each blower is therefore directed downward through a spout 40, carrying with it the attenuated fibers 39. The spouts 40 are of streamlined formation, i. e., the walls of each spout are downwardly divergent and have their upper marginal portions 41 curved to provide a flared mouth (see Figs. 3 to 8). The spout 40 is of the Venturi type, the shape and arrangement being such that an indraft of air is induced by the drawing force of the steam blast, so that a considerable volume of air is drawn into and intermixed with the steam. The induced air entering radially from the surrounding atmosphere into the spout prevents any fibers from being thrown outside of the mouth opening where they would be lost. The fact that the overall dimensions of the open upper ends of the spouts are substantially the same as the overall dimensions of the blower and the resulting blast pattern greatly facilitates the creation of an induced draft of outside air over the upper edge of the spout inwardly and downwardly, thus providing a suction and a strong downward draft free from excessive turbulence or eddy currents. This construction also eliminates back pressures and backdrafts by which part of the forming fibers may be carried upward through the upper end of the spout.

The lower ends of the spouts 40 open into an expansion hood or chamber 42 which is also of streamlined and expanding construction and forms an accumulating chamber within which the groups of fibers from the several spouts are mixed or combined and matted together to form a mat or web 43 which, as it forms, is continuously carried forward beyond the hood by a traveling conveyor 44. The conveyor is supported on rollers 34.

The chamber 42 is gradually expanding in horizontal cross-section, thus permitting a gradual expansion of the gases as they flow in smooth streamline. The main portion of the increase in horizontal cross-section is due to the divergent angle of the rear wall 90 forming the tail of the hood. The forward wall 91 is designed to present a minimum of expansion for the gases, and its contours more or less conform to the straight streamlined flow of the fibers as they descend through the spout 40 and down upon the belt 44. This permits the kinetic energy or inertia of the individual fibers to throw themselves directly upon the belt 44, freeing themselves from the vehicular gases which tend to expand toward the tail of the hood which flares divergently toward the rear. As a result a large portion of the vehicular gases, more or less devoid of fibers, is permitted to pass through the belt 44 near the tail end of the hood where there is either an absence of deposited fibers or where the fibers have packed themselves less densely than at the forward end of the hood directly under the spout.

The battery of sprouts 40, as shown in Figs. 3 to 8, is preferably arranged in pairs, the pairs of spouts being preferably placed side by side so as to form two rows of spouts. Each spout is adjustably supported by means of stop bolts 44', the latter being adjustable vertically on the spout and supported on ledges 45 at the upper end of the manifold hood 42. Each spout is adapted to be tilted or have its upper end hung inward, as shown at the right in Figs. 7 and 8, to a position at one side of the corresponding blower. This is sometimes necessary or desirable when a feeder or blower is not in use, or for the purpose of adjustment or repairs.

When a spout is swung to its inoperative position, a cover plate 46 is automatically moved into position to close the spout. This prevents an upward draft through the spout from the chamber 42. Each cover plate 46 is carried on a pair of arms 47 provided with elongated openings 48, by means of which the arms are fulcrumed on pins 49 on the spout 40. The swinging movement of the arms 47 is controlled by a pair of rock arms 50 fulcrumed on a horizontal shaft 51, said rock arms being formed with longitudinal slots 52 which engage pins 53 on the arms 47. Stop lugs 54 engage the arms 47 when the spout is in its operative position, and limit the swinging movement of the cover plate. The spout is held in its vertical or operative position by a latch 55 fulcrumed at 56 and engaging a lug or sleeper 57 on the spout. When it is desired to move a spout to inoperative position, as shown in full lines at the right in Fig. 7, the latch 55 is released and the spout swung inwardly. The slot and pin connection 52, 53 operates to swing the cover plate 46 over the open end of the spout thereby closing the latter.

Referring again more particularly to Figs. 1 and 2, the fibers are arrested in their downward movement through the forming hood 42, by the foraminous conveyor 44 while the steam or gas passes through the conveyor into chambers 58 thereunderneath. These chambers are extended and unite to form a conduit 59 which includes a vertical stack or chimney 60 through which the exhaust gases may be conveyed upwardly through the building. If desired, atmospheric air may be admitted through an opening 61 leading into the spout 60. The air admitted through the opening 61 assists in cooling and condensing the steam and is useful in maintaining and regulating the force of the blast.

The degree of flare of the spout opening 41 at the marginal portions is important. Without the flare, a tremendous turbulence and vibration may be set up, together with an unbearable noise. If, on the other hand, the flare of the mouth opening 41 should be too large, the steam blast may blow against the curved sides thereof and blow backwardly along the edges and sides thereof, throwing out a large quantity of wool. The flare should be relatively small, say of about ½ inch radius, this being satisfactory for most cases in which the mouth openings are about 7½ by 2¼ inches in cross-sectional dimension, and the steam pressure is about 150 pounds per square inch. In any event, the flare should be designed to permit a smooth streamlined flow of a Venturi type into the spout opening whereby a high steam pump effect is produced within the spout, and back pressure is minimized. The velocity of the steam which emerges from the blowers may be extremely high, and is frequently in the neighborhood of about seventy-five thousand feet per minute, and as much as 500 to 600 pounds of steam per hour may be passed through each spout opening. The expansion hood, however, serves to reduce the velocity thereof to a point where it may pass through the belt at a relatively slow speed of only about 500 or so feet per minute, and with 8 bushings about 25,000 cubic feet of air and steam may be carried through the belt per minute. In order to carry away this large amount of gaseous material, a belt area of about 50 square feet may be used. The lateral dimensions and the exposed area of the belt may be varied, however, within wide limits to form mats of predetermined widths.

The figures mentioned hereinabove are merely exemplary and are not to be considered as limiting or narrowing the present invention to these dimensions, sizes, rates, pressures, temperatures, etc., for it is to be understood that other conditions may be used without departing from the spirit and scope of the present invention.

The above described construction is such that the downward blast through the hood 42 is strongly maintained through the screen conveyor, without the use of suction chambers or the like beneath the conveyor. Referring to Fig. 1, it will be seen that the fibers from each pair of spouts 40 form a layer as they are arrested by the conveyor 44. Part of the intermatting and entangling of the fibers is accomplished before they are deposited upon the belt 44. From here they are deposited in layers upon the conveyor. The superposed layers from the individual spouts unite and the fibers are intermingled and felted or matted together so as to form an integral continuous mat 43.

As the fibers are arrested and collect upon the conveyor, they are preferably simultaneously sprayed with a suitable tempering oil or coating substance which may be applied in the form of a spray by means of the spray gun 15 at the back end or tail of the hood 42. The spray gun 15 is adjustably positioned and directed against the mat 43 as it is being formed. As illustrated in Fig. 1, the mat forms on the belt in a tapered formation which simultaneously exposes all portions of its cross-section. Each stratum, so-called, of the mat has a particular place during its formation on the belt at which it is uncovered and exposed to the atmosphere above. For example, the lowest stratum of the mat is formed at the back end of the hood, whereas the upper stratum is formed near the front end. Each stratum is exposed for approximately the same length of time before being covered up by an overlying stratum. Of course, by the use of the term "stratum," it is not intended to imply that distinguishable zones of fibrous material necessarily form. The spray nozzles are mounted in such a position and aimed in such a direction that the spray of coating substance will be projected uniformly over the entire tapered cross-section whereby substantially all of the coating substance is deposited by means of a filtering action through the unfinished mat. The vehicular gases or blast gases pass through the mat and exhaust at the outlet therefor.

The mat, as it is formed, is directed through a throat 62 and passes beneath a pressure plate 63 by which the mat is further compacted. The plate 63 is fulcrumed at its rear end by a rod 64, with the forward end of the plate resting on the mat. A weight 65 is mounted on a rod 66 fulcrumed at 67, the forward end of the rod being connected through the link 68 to the forward end of the plate 63. The downward pressure applied to the plate 63 materially assists in compacting the fibers into a mat of the desired density, the amount of pressure being regulated by the adjustment of the weight 65. The plate 63 also prevents the passage of blast gases out through the front end of the hood.

The conveyor 44 is supported on a framework 70 and runs over rolls 71, 72, 73, 74 and 75. The roll 74 is carried on a takeup device 82 of conventional construction for taking up slack in the conveyor 44. The conveyor is driven continuously by an electric motor 76. Power is transmitted from the motor through belt 77, pulley 78, speed reduction gearing contained within gear box 79, and a belt 81 connected to drive the roll 72.

Heretofore, considerable difficulty has been experienced with the type of apparatus herein disclosed for carrying matted glass wool or the like on a screen or openwork conveyor, owing to the fibers working into and adhering to the conveyor. This interfered with the removal of the mat or bat from the conveyor and rendered it necessary to stop operations at intervals for cleaning the conveyor. In order to overcome this difficulty, we have provided stripper or clearing mechanism 83 for automatically severing or freeing the mat from its entanglement with the wire mesh conveyor.

This clearing mechanism 83 comprises a knife blade or scraper 84 which overlies the conveyor 44 and extends transversely thereacross. The blade is mounted in the lower ends of a pair of vertically disposed arms 85, the upper ends of which are pivotally connected to a rod 86 mounted in a framework 87. An electric motor 88 mounted on the frame 87, drives a shaft, the ends of which are provided with cranks or eccentrics connected through links 89 to the arms 85. Coil springs 93 hold the lower sections of the arms with a yielding pressure. The motor 88 is driven continuously and thereby imparts a continuous reciprocating movement to the arms 85 and the blade 84. The blade operates to either withdraw or sever any fibers which have become entangled in the conveyor, thereby freeing the advancing mat as a whole from entanglement with the conveyor so that the mat or the bat severed therefrom can readily be removed. The stripper 83 also prevents clogging of the conveyor, thus preventing interference with the free passage of steam or air therethrough during the formation of the mat.

Modifications may be resorted to within the spirit and scope of the present invention.

We claim:

1. The combination with means for flowing a stream of molten mineral material, a blower arranged to direct a gaseous blast to engage the stream and impel the same outwardly from said means to attenuate said stream into fibers, and a foraminous arresting surface upon which said fibers are deposited, of a blast confining elongated hood between said blower and said arresting surface having a narrow throat opening at one end aligned with said blower, the overall dimensions of which end are so related to the cross-sectional area of the blast at its point of entry into the hood as to coact with the blast to create a steam pump effect and draw air into the hood, said end opening to the atmosphere adjacent the blower and adapted to receive the blast and stream through the throat opening thereof together with air induced by the blast from the atmosphere, and the walls of the hood diverging gradually in the direction of movement of the blast to enhance the flow of air into the throat opening and gradually decelerate the blast in its passage through said hood.

2. The combination with means for flowing adjacent streams of molten glass in parallelism and a plurality of adjacent blowers arranged to envelop the streams in blasts of gas and attenuate the streams to fibers, of blast confining open-ended spouts individual to the blowers and each having an opening at one end of substantially the same cross-sectional area as the blast and in line with its respective blower to receive the blast issuing from said blower together with the stream enveloped thereby, the spouts being flared in the direction of travel of the blasts and acting to guide the blasts in mutually isolated gradually expanding paths, a common manifold hood with which the opposite open ends of the spouts communicate, and a foraminous fiber-arresting surface in said hood at the end of said hood opposite to that adjoining the spouts and on which the fibers are deposited.

3. The combination of means for flowing streams of molten mineral material, a plurality of adjacent blowers arranged to envelop the streams in downwardly directed blasts of gas capable of attenuating said streams into fibers, blast confining open-ended spouts individual to the blowers having their upper ends arranged beneath their respective blowers to receive the blasts therefrom, each of said spouts being flared outwardly and downwardly and the cross-sectional area of said upper ends being so related to that of the blasts at their point of entry into the spouts as to provide a steam pump action to draw air into said spouts, the spouts providing separated gradually expanding passages for the blasts to prevent intermingling of the blasts, a common manifold hood into which the lower ends of the spouts open and in which said blasts and fibers conflow, and a foraminous arresting surface in said chamber on which the fibers are deposited in a unitary mat.

4. The combination of means for flowing streams of molten glass, a blower operative and arranged to envelop said streams in a downwardly directed blast of gas, and a vertically disposed spout open at top and bottom spaced below the blower in position to receive said blast, the lip portion of the spout at the upper end thereof being upwardly and outwardly flared, the spout beneath said lip being downwardly and outwardly tapered.

5. The combination of means for flowing streams of molten glass, a blower constructed and arranged to envelope the streams in a downwardly directed blast of gas, a vertically disposed spout beneath the blower in position to receive said blast, said spout being shiftable laterally to a position outside the path of the blast, a cover for said spout, and automatic means for moving said cover into spout closing position when the spout is shifted.

6. The combination of means for flowing streams of molten glass, a blower constructed and arranged to envelop the streams in a downwardly directed blast of gas, a vertically disposed spout beneath the blower in position to receive said blast, means for shifting the spout to an inoperative position, and automatic means for closing the spout when it is shifted.

7. The combination of means for flowing streams of molten glass, a battery of blowers constructed and arranged to envelop said streams in downwardly directed blasts of gas, spouts individual to said blowers, said spouts being positioned to receive said blasts, a manifold chamber into which said spouts open, said spouts being individually movable to inoperative position, and automatic means to close a spout when it is moved to inoperative position.

8. The combination with a blower, a spout in line therewith, a cover plate for the spout normally positioned at one side of the mouth of the spout, a lever arm carrying said cover plate, said spout being movable laterally to an inoperative position, and means by which said lateral movement operates said lever to swing the cover plate to spout closing position.

9. The combination with means for flowing streams of molten mineral material, a blower arranged to envelop said streams in a downwardly directed blast of gas to attenuate said streams into fibers, and a fiber deposition chamber provided with a foraminous arresting surface on which said fibers are deposited, of a vertically disposed spout having a restricted throat opening at its upper end of a cross-sectional area substantially the same as that of said blast at its point of entry into the hood, said spout being positioned below the blower with its upper end spaced therefrom and arranged to receive the blast in its entirety together with air induced by the blast and with its lower end in communication with said chamber, said spout being flared outwardly and downwardly to enhance the flow of air into said spout and to cause the blast and air therein to be gradually expanded and the velocity thereof gradually decreased.

10. In apparatus for producing a fibrous mineral bat material having means for flowing a stream of molten mineral material, a blower spaced from said means, and means for supplying a gaseous medium to produce a blast that engages the stream and attenuates the same into fibers, a hood having an end spaced from the blower of a cross-sectional area slightly in excess of that of said blast at its point of entry into the hood to receive the blast and air induced by said blast while preventing backflow through said end, said hood having side walls diverging in the direction of movement of the blast to provide a passage gradually expanding in cross-section to enhance the induction of air into the hood and conduct said blast and air with the fibers in a gradually expanding stream with a minimum of turbulence, and a foraminous arresting surface at the discharge end of said hood through which said blast and air passes causing the fibers to felt up in a mat on said surface.

11. The combination of means for flowing a plurality of streams of molten glass, blowers individual to said streams arranged to envelope the streams in gaseous blasts directed generally in the direction of stream flow to attenuate said streams into fibers, blast confining open-ended spouts individual to the blowers and each having one end positioned adjacent its respective blower in spaced relation thereto to receive the blasts and streams enveloped thereby, said end being flared and provided with a throat of cross-sectional area slightly in excess of that of the blasts and the walls of said spouts being gradually divergent from said throats in the direction of movement of the blasts whereby a venturi action is set up by the blasts issuing from the blower and induced air is drawn into the upper ends of the spouts to intermingle with and augment said blasts, a chamber into which said spouts discharge, and a foraminous arresting surface in said chamber for receiving the fibers carried by the blasts.

12. The combination with a foraminous arresting surface, means for moving said surface forwardly in one direction, means for flowing streams of molten mineral material, and a blower arranged to envelop said streams in gaseous blasts and to forcibly direct the blasts and streams in a direction generally normal to the moving arresting surface to produce fibers and deposit the same on said surface in a restricted deposition zone, of means for confining said blasts and streams comprising an open-ended hood having one end of a cross-sectional area slightly in excess of that of said blasts positioned adjacent the blower but spaced therefrom and arranged to receive the blasts and streams enveloped thereby, and said hood having walls which are gradually divergent in the direction of stream flow to limit the blasts and streams to a gradual expansion progressing in the direction of stream flow, said walls terminating in close proximity to the arresting surface and one of said walls extending rearwardly of the deposition zone at an angle to the direction of movement of said blast into said end and terminating adjacent the arresting zone in a region removed from said zone of fiber deposition to facilitate passage of said blast gases through said surface rearwardly of said deposition zone.

13. The combination with a foraminous arresting surface, means for flowing streams of molten glass, and a blower arranged to envelop said streams in gaseous blasts and to forcibly direct the blasts and streams in a direction generally normal to the arresting surface to produce fibers and deposit the same on said surface in a restricted deposition zone, of means for confining said blasts and streams and preventing scattering of the streams comprising an open-ended hood having one open end positioned adjacent the blower but spaced therefrom and arranged to receive the blasts and streams enveloped thereby, said end being flared and said hood having walls which are gradually divergent in the direction of stream flow to provide a Venturi action and cause air to be induced over the edge of the same, said walls terminating in close proximity to the arresting surface and one wall extending rearwardly of the deposition zone at an angle to the direction of movement of said blast into said end and terminating adjacent the arresting zone in a region removed from said zone of fiber deposition to facilitate passage of said blast gases through said surface rearwardly of said deposition zone.

14. The combination with a foraminous arresting surface, means for flowing streams of molten glass, blowers arranged to envelop said streams in a plurality of gaseous blasts and to forcibly direct the blasts and streams in a direction generally normal to the arresting surface to produce fibers and deposit the same on said surface, of means for confining said blasts and streams and preventing intermingling of the streams comprising spouts individual to the blowers having open ends positioned adjacent but spaced from the blowers and arranged to receive the blasts and the streams enveloped thereby, said ends being flared and the spouts having walls which are gradually divergent in the direction of stream flow to provide a Venturi action and cause air to be induced by the blasts into the spouts, and a chamber into which the other ends of said spouts open and in which said blasts conflow, said chamber having walls terminating in close proximity to the arresting surface.

15. The combination with means for flowing a stream of molten mineral material, and a blower arranged to direct a gaseous blast to engage the stream and impel the same outwardly from said means to attenuate said stream into fibers, of a blast confining elongated hood having a narrow throat opening at one end, the overall dimensions of which are slightly in excess of the overall dimensions of the blast at its point of entry into the hood, said end being spaced from the blower a slight distance and adapted to receive the blast and stream through the throat opening thereof together with air induced by the blast, the walls of the hood diverging gradually in the direction of movement of the blast to enhance the flow of air into the throat opening and gradually decelerate the blast in its pasage through said hood.

16. The combination with a foraminous arresting surface, means for moving said surface forwardly in one direction, means for flowing streams of molten mineral material, and a blower arranged to envelop said streams in gaseous blasts and to forcibly direct the blasts and streams in a direction generally normal to the moving arresting surface to produce fibers and deposit the same on said surface in a restricted deposition zone, of means for confining said blasts and streams comprising an open-ended hood having one end of a cross-sectional area so related to that of said blasts as to coact with the blasts to create a steam pump action and draw air into the hood, said ends being positioned adjacent the blower but spaced therefrom and arranged to receive the blasts and streams enveloped thereby, and said hood having walls which are gradually divergent in the direction of stream flow to limit the blasts and streams to a gradual expansion progressing in the direction of stream flow, said walls terminating in close proximity to the arresting surface.

17. The combination with means for flowing a stream of molten mineral material, and a blower arranged to direct a gaseous blast to engage the stream and impel the same outwardly from said means to attenuate said stream into fibers, of a blast confining elongated hood having a narrow throat opening at one end, the overall dimensions of which are so related to the cross-sectional area of the blast at its point of entry into the hood as to coact with the blast to create a steam pump effect and draw air into the hood, said end being spaced from the blower a slight distance and adapted to receive the blast and stream through the throat opening thereof together with air induced by the blast, and the walls of the hood diverging gradually in the direction of movement of the blast to enhance the flow of air into the throat opening and gradually decelerate the blast in its passage through said hood.

DALE KLEIST.
GAMES SLAYTER.